Dec. 13, 1966    S. J. BECKER    3,291,492
SEAL WITH DEFLECTOR MEANS
Filed June 22, 1964

Inventor
Sylvan J. Becker
By John W. Butcher
Atty.

United States Patent Office 3,291,492
Patented Dec. 13, 1966

3,291,492
SEAL WITH DEFLECTOR MEANS
Sylvan J. Becker, Crete, Ill., assignor to Borg-Warner Corporation, Chicago, Ill., a corporation of Illinois
Filed June 22, 1964, Ser. No. 376,950
3 Claims. (Cl. 277—42)

This invention relates to annular fluid seal devices, and more particularly, to a face seal having a deflector shroud associated therewith.

Certain face seals employ an elastomeric member as a structural backbone of the seal. This elastomeric member may be fitted within an appropriate recess in the pump housing. A pump shaft extends through a central opening in the elastomeric member. This shaft carries an impeller hub, which hub is normally provided with a radially extending sealing surface. A sealing washer is carried by the elastomeric member and is urged away from the elastomeric member and into engagement with the radially extending sealing surface by a resilient washer.

A problem exists when pumping certain types of fluids which fluids contain abrasive materials. The problem is believed to be caused by the abrasive material impinging against the radially extending sealing surface near the sealing washer and subsequently lodging therebetween thereby causing wear and premature failure of the seal assembly. Attempts have been made to eliminate this problem by extending the retainer member axially forwardly over the sealing washer to form a shroud (see U.S. Patent 2,598,886, Brummer). Although the use of a metallic shroud as shown in U.S. Patent 2,598,886 generally results in improved life of the seal, it also results in increased cost of the seal as well as complicates the process of assembly thereof.

Briefly described, the present invention utilizes an elastomeric member which includes a forwardly extending tubular portion. The forwardly extending tubular portion enshrouds the face of the sealing washer to provide a means to protect the face of the sealing washer from exposure to the fluid being circulated by the impeller.

Figure 1:
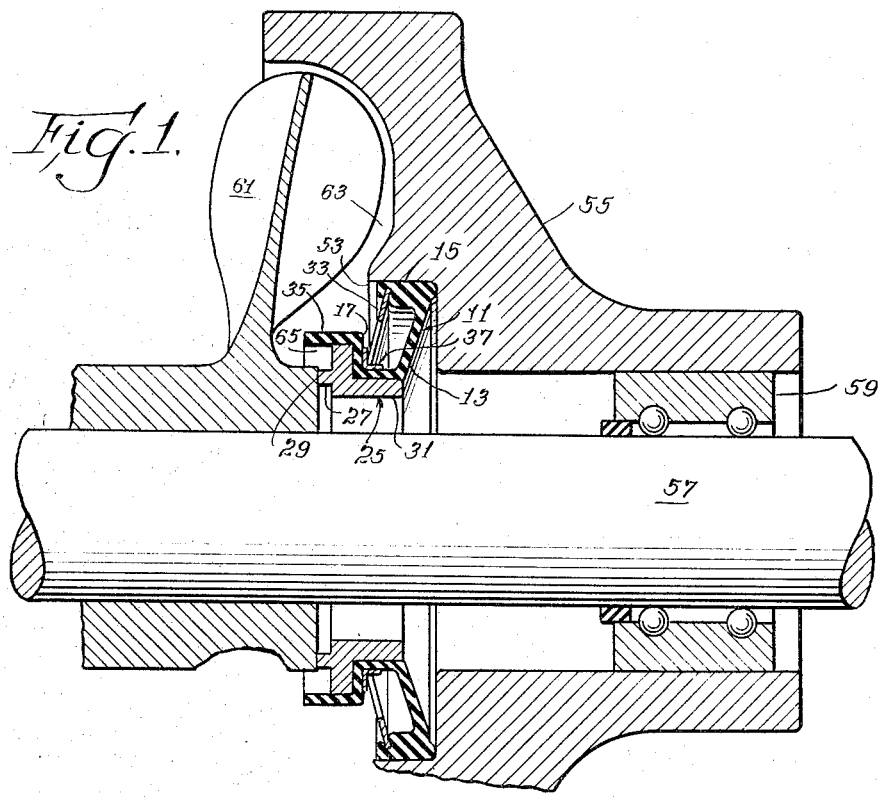
Figure 3:
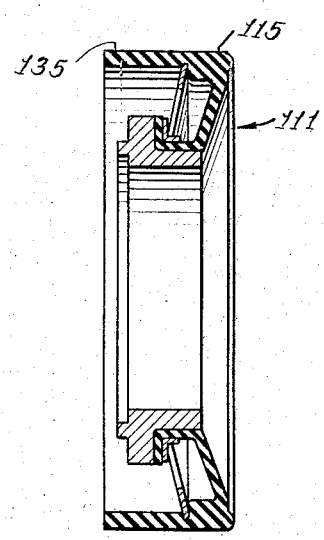
Figure 2:
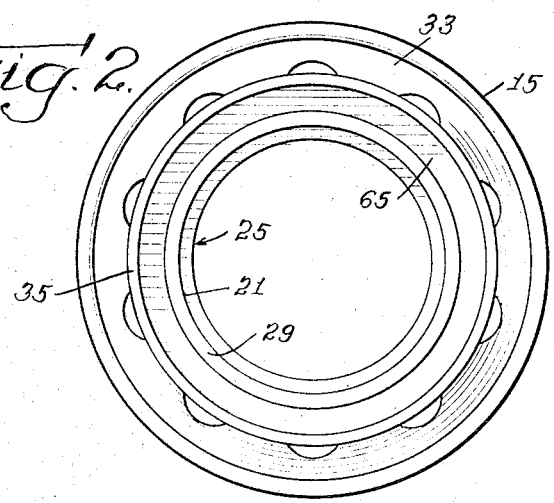

Other features of this invention will be apparent from the following detailed description taken together with the accompanying drawings, in which:

FIGURE 1 is a side view, partially in cross-section, of the seal assembly;
FIGURE 2 is an end view taken generally along lines 2—2 of FIGURE 1;
FIGURE 3 is a side view, partially in cross-section, of an alternate embodiment of the present invention.

Referring now to the drawing and, more particularly, FIGURE 1, an elastomeric member 11 includes an intermediate portion 13, an outer portion 15, and an inner front flange portion 17.

A sealing washer or ring 25 is desirably molded of an antifriction substance such as a phenolic condensation product impregnated with graphite. The sealing washer 25 has an annular nose 27 which nose 27 is provided with a radially extending sealing face 29. The sealing washer 25 is provided with a central opening 31.

The elastomeric sleeve 11 has a spring washer 33 associated therewith to provide an axial thrust between the elastomeric sleeve 11 and the sealing washer 25. The elastomeric sleeve 11 has a tubular shroud 35 formed integral therewith. This shroud 35 extends axially forwardly about the sealing washer 25 into a zone adjacent the sealing face 29.

A ferrule 37 is provided adjacent the front flange 17 of the sealing washer 25. This ferrule provides a working surface for the inner periphery of the spring washer 33.

The forwardly extending tubular shroud portion 35 of the elastomeric sleeve 11 extends forwardly past the front sealing face 29 of the sealing washer 25 and provides means to isolate the fluid being circulated by the impeller from the zone immediately adjacent the sealing washer nose 27.

An alternate embodiment (FIGURE 3) includes a shroud 135 which, like the embodiment of FIGURE 1, is also formed as a part of the elastomeric sleeve 111. This shroud, however, is formed integral with the outer portion 115 of the elastomeric sleeve 111.

In operation, the seal assembly of FIGURE 1 is installed such that the outer portion 15 of the elastomeric member 11 is fitted within a recess 53 formed in the housing 55. A pump shaft 57 extends through the housing 55 and is rotatably supported with respect thereto by bearing 59. The inner end of the shaft 57 supports a pump impeller 61. The pump chamber 63 as well as the exterior portion of the elastomeric sleeve 11 is exposed to the fluid being circulated by the impeller 61. The forwardly extending shroud 45, however, isolates an annular zone 65 from the fluid circulating within the chamber 63. This, in turn, substantially increases the life of the seal assembly.

This seal assembly, relative to an assembly as illustrated in U.S. Patent 2,598,886, is less expensive, is easier to assemble, and exhibits improved operational life under conditions wherein an abrasive fluid is being circulated within the pump housing.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:
1. A seal comprising an elastomeric member having an outer portion, an intermediate portion and an inner portion; a sealing washer carried by said inner portion adapted to shift axially with respect to said outer portion; said sealing washer having a radially disposed sealing face on the forward end thereof; a tubular shroud formed integral with said elastomeric member extending forwardly over said sealing washer in a zone to provide a deflector means for said radially disposed sealing face; and a resilient spring washer interposed between said outer portion and said inner portion whereby said sealing washer is normally urged away from said outer portion.
2. An apparatus in accordance with claim 1 wherein said tubular shroud is formed integral with said outer portion.
3. An apparatus in accordance with claim 1 wherein said tubular shroud is formed integral with said outer portion.

References Cited by the Examiner

UNITED STATES PATENTS

| | | | |
|---|---|---|---|
| 2,608,425 | 8/1952 | Krut | 277—42 |
| 2,784,016 | 3/1957 | Heimbuch | 277—86 X |
| 2,856,210 | 10/1958 | Schoenrock | 277—41 X |
| 2,961,258 | 11/1960 | Donley et al. | 277—83 X |

SAMUEL ROTHBERG, *Primary Examiner.*